(12) United States Patent
Larson et al.

(10) Patent No.: US 11,522,398 B2
(45) Date of Patent: Dec. 6, 2022

(54) ELECTRIC MACHINE ROTOR END PLATES

(71) Applicant: Hamilton Sundstrand Corporation, Charlotte, NC (US)

(72) Inventors: Eric Alan Larson, Rockford, IL (US); Brady A. Manogue, Beloit, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 286 days.

(21) Appl. No.: 16/740,731

(22) Filed: Jan. 13, 2020

(65) Prior Publication Data

US 2021/0218302 A1 Jul. 15, 2021

(51) Int. Cl.
*H02K 1/32* (2006.01)
*H02K 3/24* (2006.01)
*H02K 5/20* (2006.01)

(52) U.S. Cl.
CPC .................. *H02K 1/32* (2013.01); *H02K 3/24* (2013.01); *H02K 5/20* (2013.01)

(58) Field of Classification Search
CPC ................................... H02K 1/32; H02K 9/19
USPC .................................................. 310/400, 417
See application file for complete search history.

(56) References Cited

U.S. PATENT DOCUMENTS

| 2,920,218 | A | 1/1960 | Beckwith | |
|---|---|---|---|---|
| 2016/0020673 | A1* | 1/2016 | Pal | H02K 1/325 310/54 |
| 2019/0186622 | A1* | 6/2019 | Ishikawa | F16H 57/021 |

FOREIGN PATENT DOCUMENTS

| DE | 102018222469 A1 | * | 6/2020 | ............... H02K 1/32 |
|---|---|---|---|---|
| EP | 2975741 A2 | | 1/2016 | |
| FR | 3076672 A1 | | 7/2019 | |
| JP | 2010239799 A | | 10/2010 | |
| WO | WO-2021099045 A1 | * | 5/2021 | ........... H02K 1/2766 |

OTHER PUBLICATIONS

Extended European Search Report dated Jun. 17, 2021, issued during the prosecution of European Patent Application No. EP 21151154.8.

* cited by examiner

*Primary Examiner* — Quyen P Leung
*Assistant Examiner* — Minki Chang
(74) *Attorney, Agent, or Firm* — Locke Lord LLP; Joshua L. Jones; Scott D. Wofsy

(57) ABSTRACT

A supply end plate apparatus includes a supply end plate with an aperture therethrough configured to be mounted at a first axial end of the rotor core for supplying fluid to the rotor core. The supply end plate defines a plurality of end plate passages therein extending outward from an inward portion of the supply end plate toward an outward portion of the supply end plate. Each of the plurality of end plate passages includes: a radial section extending in a radial direction from an inlet in the inward portion of the supply end plate toward the outward portion; a transition section extending obliquely from the radial section; and a circumferential section extending circumferentially from the transition section to an outlet of the supply end plate.

18 Claims, 11 Drawing Sheets

ELECTRIC MACHINE ROTOR END PLATES

BACKGROUND

1. Field

The present disclosure relates to electrical machines such as electric motors and generators, and more particularly to cooling for electrical machines.

2. Description of Related Art

Cooling of main generator rotors and stators is required to keep operating temperatures as low as possible. The design challenge is to reduce the friction and windage that occurs from the cooling oil flowing in the air gap between the rotor and stator. Effective designs aim to place the oil as close to the copper windings as possible while preventing the oil from getting into the air gap. The greater extent to which this can be achieved, the greater the efficiency of the generator.

The conventional techniques have been considered satisfactory for their intended purpose. However, there is an ever present need for improved cooling for electrical machines. This disclosure provides a solution for this need.

SUMMARY

An apparatus includes a supply end plate with an aperture therethrough configured to be mounted at a first axial end of the rotor core for supplying fluid to the rotor core. The supply end plate defines a plurality of end plate passages therein extending outward from an inward portion of the supply end plate toward an outward portion of the supply end plate. Each of the plurality of end plate passages includes: a radial section extending in a radial direction from an inlet in the inward portion of the supply end plate toward the outward portion; a transition section extending obliquely from the radial section; and a circumferential section extending circumferentially from the transition section to an outlet of the supply end plate.

The radial sections and transition sections of the plurality of end plate passages can conform to a frustoconical surface of the supply end plate, and the circumferential sections can conform to a radial flange of the supply end plate. The radial flange can include a plurality of balancing holes defined axially therethrough. Each radial section, transition section, and circumferential section can be straight. Each of the circumferential portions can terminate at a countersunk axial connection bore configured to seal to a wedge with an o-ring assembled thereon for delivering fluid from the supply end plate into the wedge through a sealed connection. A plurality of structural ribs can extend from the inward portion to the outward portion for rigidity of the supply end plate, wherein the structural ribs extend conically along a conical surface of the supply end plate.

A return end plate apparatus includes a return end plate with an aperture therethrough configured to be mounted at a second axial end of the rotor core opposite the first axial end to receive fluid flowing from the first end of the rotor core to the second end of the rotor core. The return end plate defines a plurality of end plate passages therein extending inward from an outward portion of the return end plate toward an inward portion of the return end plate. Each of the plurality of end plate passages includes: a first tangential section extending from an inlet in the outward portion of the return end plate toward the inward portion in a circumferential and radial tangential direction; a second tangential section extending from the first tangential section in a direction more radial than that of the first tangential section toward the inward portion; and an axial section extending in an axial direction from the second tangential section to an outlet of the supply end plate.

The first and second tangential sections of the plurality of end plate passages can conform to a radial flange of the return end plate outward from a frustoconical section. The radial flange can include a plurality of balancing holes defined axially therethrough. Each axial section, first tangential section, and second tangential section can be straight. Each of the first tangential portions can originate at a countersunk axial connection bore configured to seal to a wedge with an o-ring assembled thereon for delivering fluid the wedge through a sealed connection into the return end plate. A plurality of radiating structural ribs can extend from the inward portion to the outward portion for rigidity of the supply end plate, wherein the structural ribs extend conically. An annular structural rib can intersect each of the radiating structural ribs, wherein the outlets of the supply end plate face radially outward from the annular structural rib.

An electric machine rotor assembly includes a rotor core defining a rotor axis. Windings are seated in the rotor core. A plurality of wedges are circumferentially spaced apart around the rotor core relative to the rotor axis. Each wedge extends axially and separating between two respective portions of the windings. A supply end plate as described above is mounted at a first axial end of the rotor core for supplying fluid to the rotor core. A return end plate as described above is mounted at a second axial end of the rotor core opposite the first axial end. A flow path for coolant fluid extends through the supply end plate into the wedges, through the wedges and into the return end plate, and through the return end plate.

An inner rotor body can be mounted within the rotor core for rotation in common with the rotor core, wherein the flow path extends from within the inner rotor body, between an axially spaced pair of o-rings sealing between the inner rotor body and the rotor core, and into a set of end plate passages. The end plate passages of the return end plate can wind in an opposite clock-wise/counter-clockwise direction from end plate passages of the supply end plate. The return end plate passages can feed into a volute in a housing that is stationary relative to the rotor core. The volute can lead to a sump away from rotational hardware of the assembly. The flow path can pass lengthwise in proximity to the windings and can completely bypass an air gap between the rotor core and a stator outward from the rotor core. A first spanner nut can secure the supply end plate to the rotor core and a second spanner nut can secure the return end plate to the rotor core.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
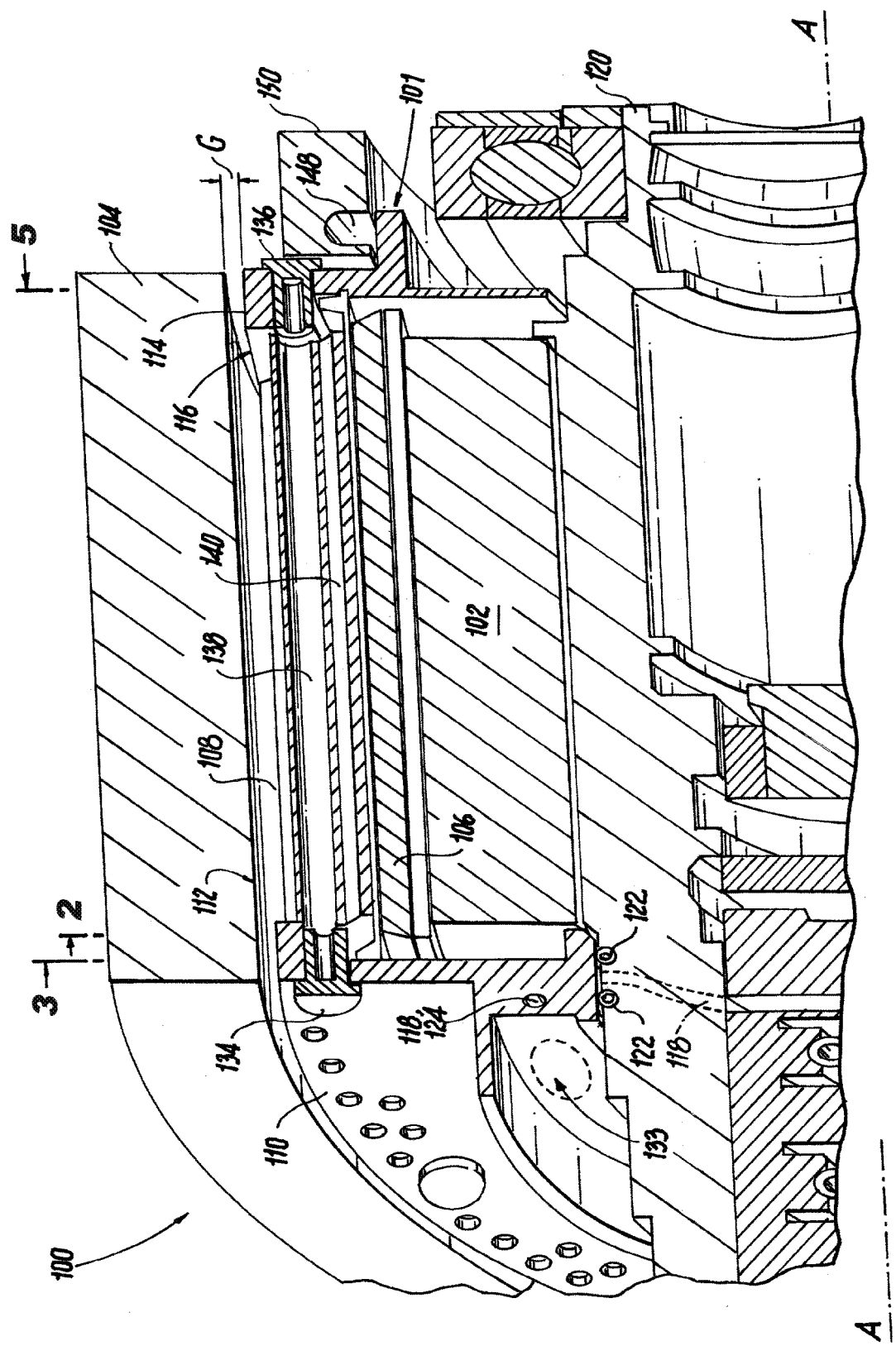
FIG. 1 is a cross-sectional perspective view of an exemplary embodiment of an electric machine rotor assembly constructed in accordance with the present disclosure, showing the supply end plate, the return end plate, one of the wedges, and windings.

Reference will now be made to the drawings wherein like reference numerals identify similar structural features or aspects of the subject disclosure. For purposes of explanation and illustration, and not limitation, a partial view of an exemplary embodiment of an electric machine rotor assembly in accordance with the disclosure is shown in FIG. 1 and is designated generally by reference character 100. Other embodiments of assemblies in accordance with the disclosure, or aspects thereof, are provided in FIGS. 2-15, as will be described. The systems and methods described herein can be used for rotor cooling with superior properties including close proximity of cooling flow to windings with little or no coolant flow into the rotor/stator air gap.

Figure 4:
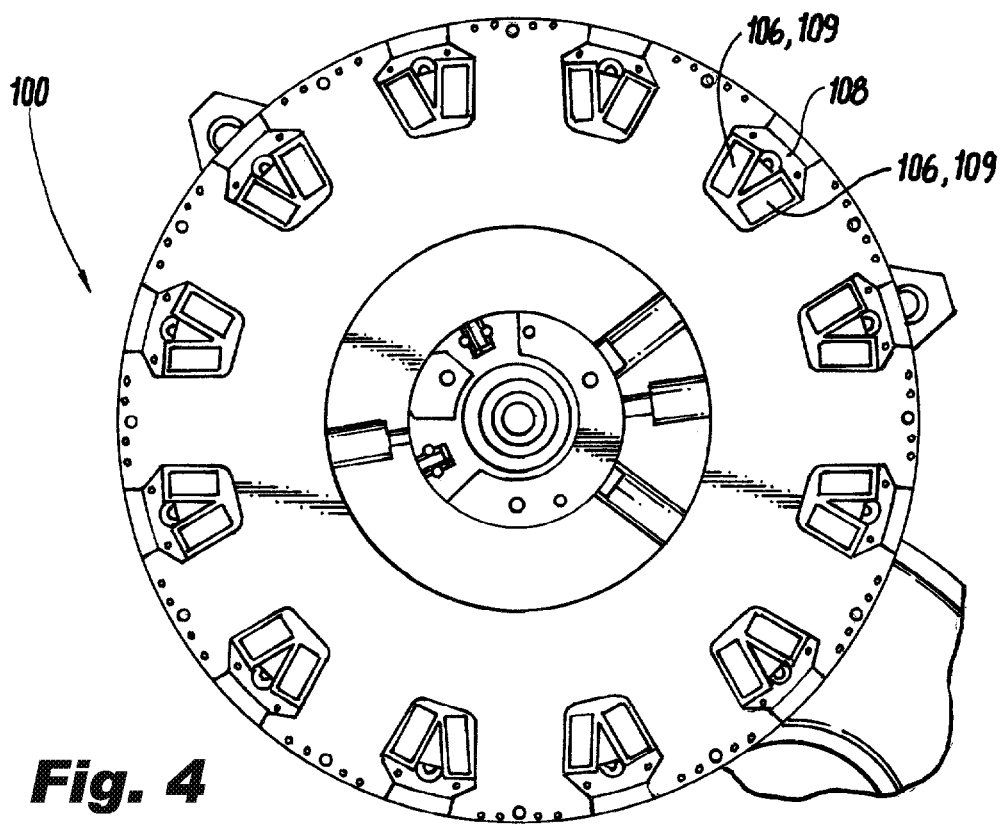
FIG. 4 is a cross-sectional axial view of the rotor of FIG. 1, showing the wedges and windings circumferentially spaced apart around the axis.

The electric machine rotor assembly 100 includes a rotor 101 including a rotor core 102 defining a rotor axis A. A stator 104, which remains stationary as the rotor 101 rotates relative thereto, e.g., driven by a prime mover, is spaced apart from the rotor 101 by a rotor/stator gap G. Windings 106 are seated in the rotor core 102. A plurality of wedges 108 are circumferentially spaced apart around the rotor core 102 relative to the rotor axis A, as shown in FIG. 4. Each wedge 108 extends axially relative to the axis A and separates between two respective portions 109 (two of which are labeled in FIG. 4) of the windings 106. A supply end plate 110 is mounted at a first axial end 112 of the rotor core 102. A return end plate 114 is mounted at a second axial end 116 of the rotor core 102 opposite the first axial end 112. A flow path 118 for coolant fluid, portions of which labeled in FIG. 1 and other portions of which are shown in the remaining figures and discussed below, extends through the supply end plate 110 into the wedges 108, through the wedges 108 and into the return end plate 114, and through the return end plate 114.

An inner rotor body 120 is mounted within the rotor core 102 for rotation in common with the rotor core 102. The flow path 118 extends from within the inner rotor body 120, and continues between an axially spaced pair of o-rings 122 sealing between the inner rotor body 120 and the supply end plate 110, and into a set of end plate passages 124, each of which is a part of the flow path 118.

Figure 2:
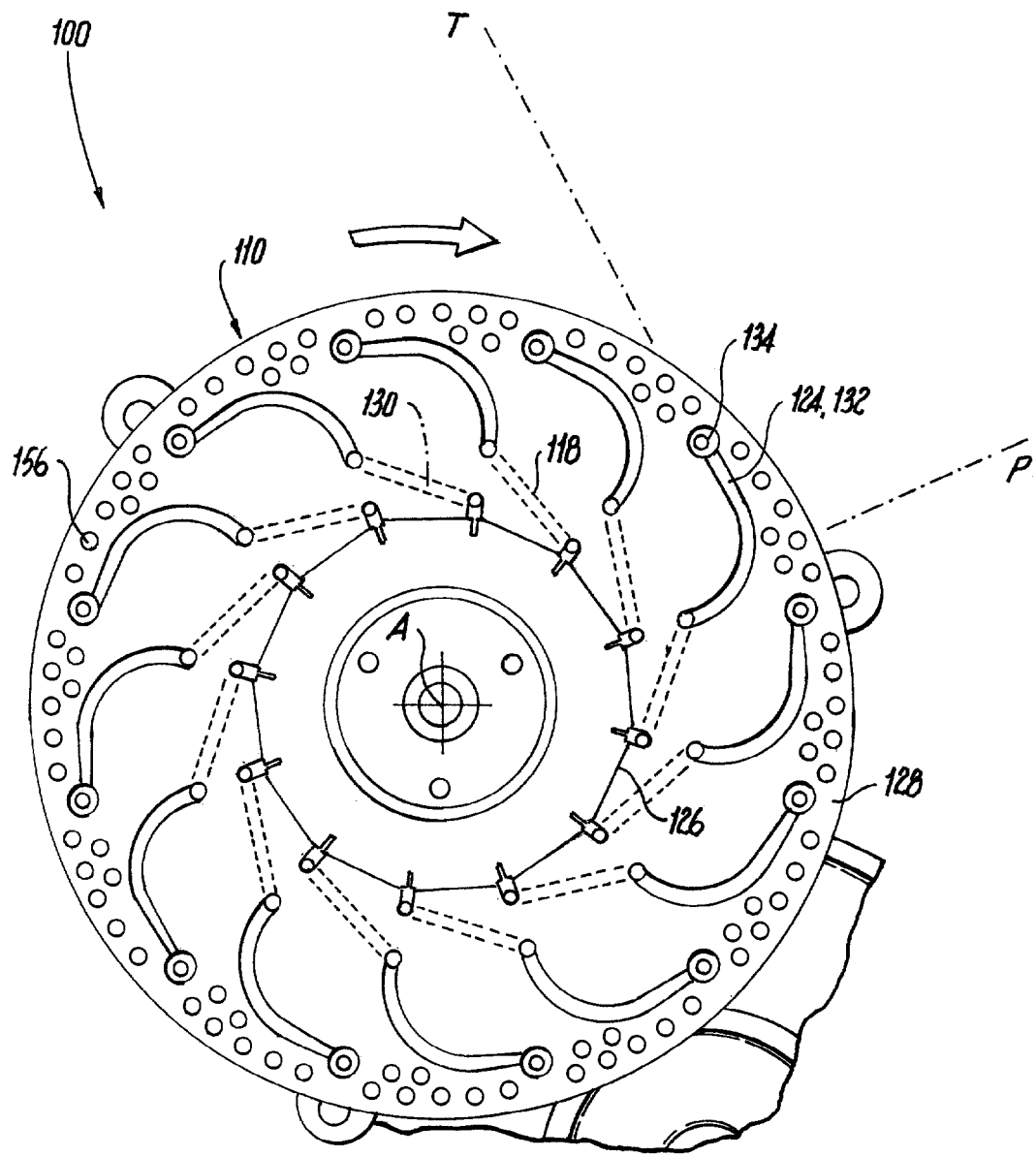
FIG. 2 is a cross-sectional axial view of the supply end plate of FIG. 1, showing the end plate passages for coolant.
Figure 3:
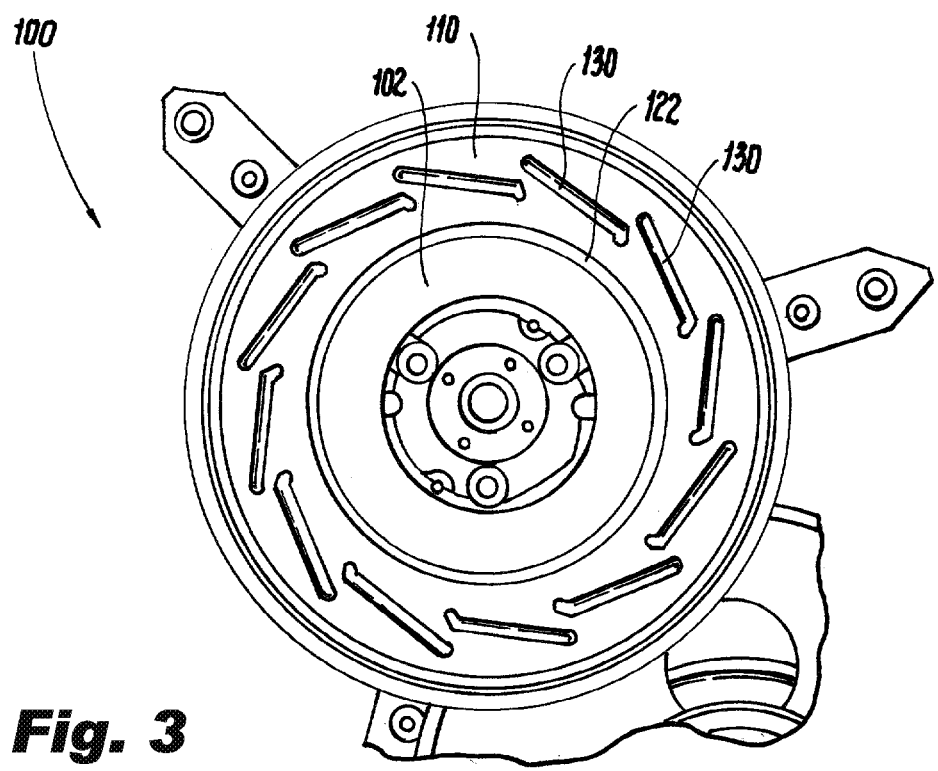
FIG. 3 is a cross-sectional axial view of the supply end plate of FIG. 2, showing another axial level of the end plate passages.

Referring now to FIG. 2, the supply end plate 110 defines a plurality of end plate passages 124 therein extending outward from an inward portion 126 of the supply end plate toward an outward portion 128 of the supply end plate. A first axial level, i.e., the cross-section of the supply end plate 110 shown in FIG. 3, of the supply end plate 110 includes straight portions 130 of the end plate passages 124 leading to curved portions 132 of the end plate passages 124 in a second axial level, i.e. the cross-section of the supply end plate 110 shown in FIG. 2, of the supply end plate 110 that is closer to the rotor core 102 than the first axial level. FIG. 2 shows the straight portions 130 of the end plate passages in broken lines. The straight portions 130 can be used to cool an exciter winding 133 indicated schematically in FIG. 1. The curved portions 132 lie in a plane perpendicular to the rotor axis A. The curved portions 132 are relatively perpendicular to the rotor axis A on an inner portion of the curved portions 132 (as indicated for one of the curved portions 132 by the line P in FIG. 2), and an outer portion of each curved portion 132 is relatively tangent to a circumferential direction around the rotor axis A (as indicated for one of the curved portions 132 by the line T in FIG. 2). Each of the curved portions 132 terminates at a banjo bolt 134 that turns the respective passage 118 into an axial direction to feed into the respective wedges 108.

As shown in FIG. 1, each wedge 108 includes a portion of the flow path 118 therein. Each such portion extends axially through the wedge 108 from a first banjo bolt 134 joining the supply end plate 110 to the wedge 108 and on to a second banjo bolt 136 joining the return end plate 114 to the wedge 108. The portion of the flow path 118 in each wedge 108 can include one, two, or multiple parallel branches 138, 140 (FIG. 1 shows two parallel branches) of unequal flow area, i.e., branch 138 has a larger flow area than branch 140.

Figure 5:
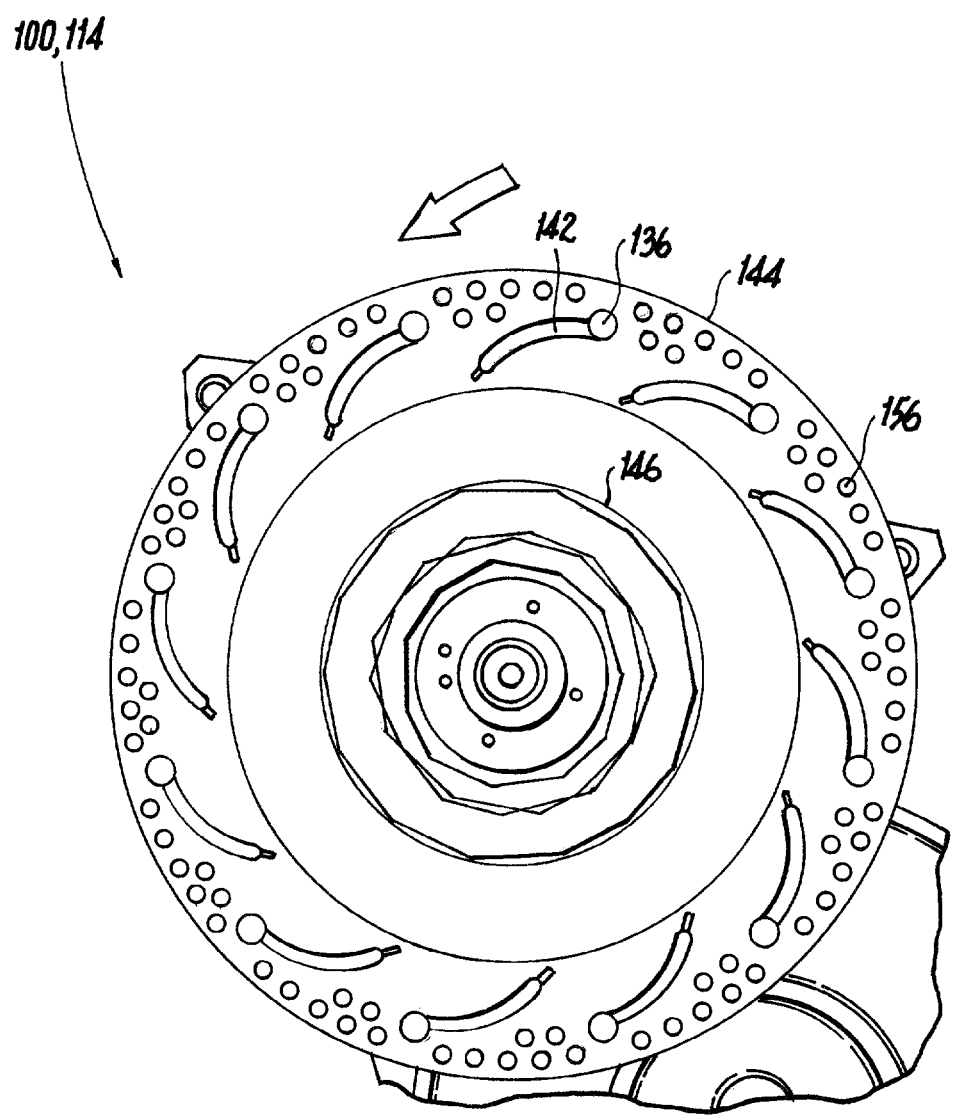
FIG. 5 is a cross-sectional axial view of the return end plate of FIG. 1, showing the end plate passages.

With reference now to FIG. 5, the return end plate 114 defines a plurality of end plate passages 142 therein extending inward from an outward portion 144 of the return end plate 114 toward an inward portion 146 of the return end plate 114. The end plate passages 142 curve in a plane perpendicular to the rotor axis A, i.e. the plane of the cross-section of FIG. 5. Noting the directions of cross-sections indicated in FIG. 1, the end plate passages 142 of the return end plate 114 wind in an opposite clock-wise/counter-clockwise direction from end plate passages 124 of the supply end plate 110, as indicated by the large arrows in FIGS. 2 and 5. These winding directions utilize rotational forces in the rotor 101 for movement of the coolant through the passage 118. The supply and return end plates 110 and 114 also accommodate the rotor balancing holes 156. The supply and return end plates 110 and 114 are shown in FIGS. 2 and 5. The passages 124, 124 can be formed by using additive manufacturing to build the supply and return end plates 110, 114.

Figure 6:
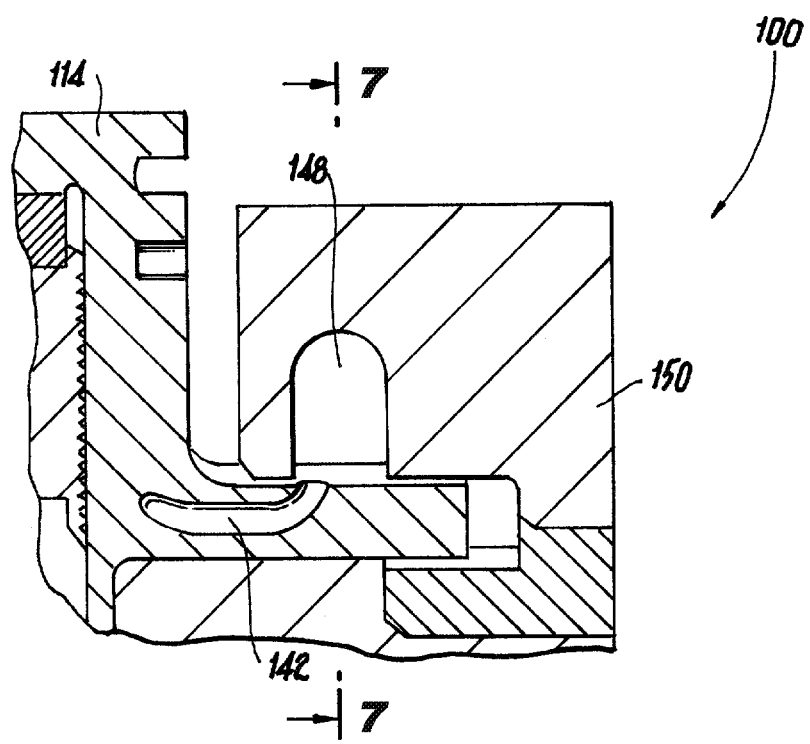
FIG. 6 is a cross-sectional radial view of a portion of the return end plate of FIG. 5, showing the volute in the housing for receiving coolant from the end plate passages.
Figure 7:
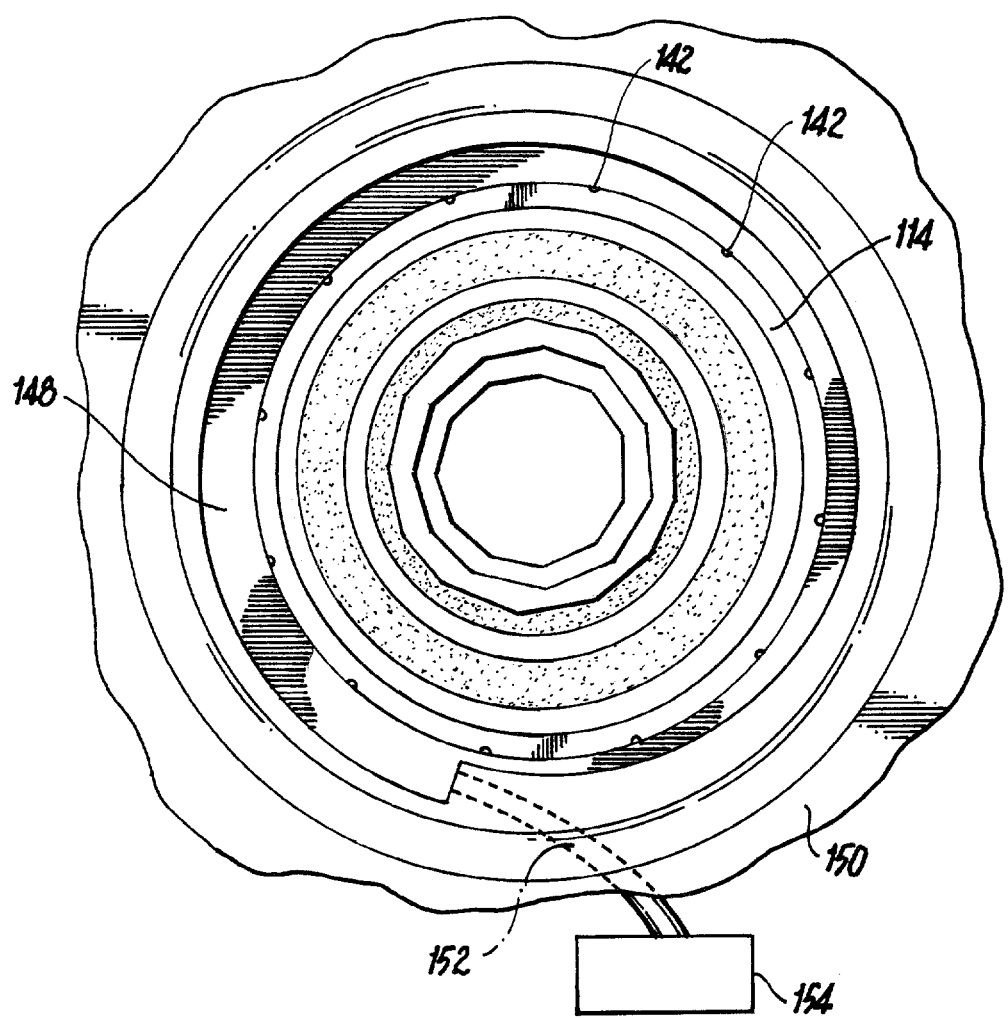
FIG. 7 is a schematic cross-sectional axial end view of the housing of FIG. 6, showing a passage for leading coolant way from the rotating components.

With reference to FIG. 6, the end plate passages 142 lead inward and empty into a volute 148 in a housing 150 that is stationary and non-rotating relative to the rotor core 102. Radial forces on the coolant reduce or prevent any coolant passing between the housing 150 and the return end plate 114 (a seal can be employed between the volute 148 and return plate 114 to further minimize any leakage). As indicated in FIG. 7, the volute 148 leads away from rotational hardware (including the rotor 101 of the assembly 100) through passage 152 (schematically indicated by broken lines in FIG. 7 at the end of the volute 148 to indicate a passage leading in the radial direction from volute 148) to a sump 154 as indicated schematically by the broken line in FIG. 7. The flow path passes lengthwise through the wedges 108, as shown in FIG. 1, in proximity to the windings 106 but completely bypasses the air gap G between the rotor core 102 and the stator 104 outward from the rotor core 102. The coolant, e.g., cooling oil, is completely contained throughout the flow path 118 from the inner rotor body 120 to the sump 154 so the coolant need not add to friction and windage losses in the gap G of FIG. 1. The coolant flow through the flow path can be driven by centripetal forces, e.g., due to the outlets of the end plate passages 142 shown in FIG. 6 being radially further from the axis A than the inlets to the end plate passages 124 shown in FIGS. 1 and 2. It is also contemplated that a pump in the flow path upstream or downstream of the rotor 101 can provide the driving potential.

Figure 8:
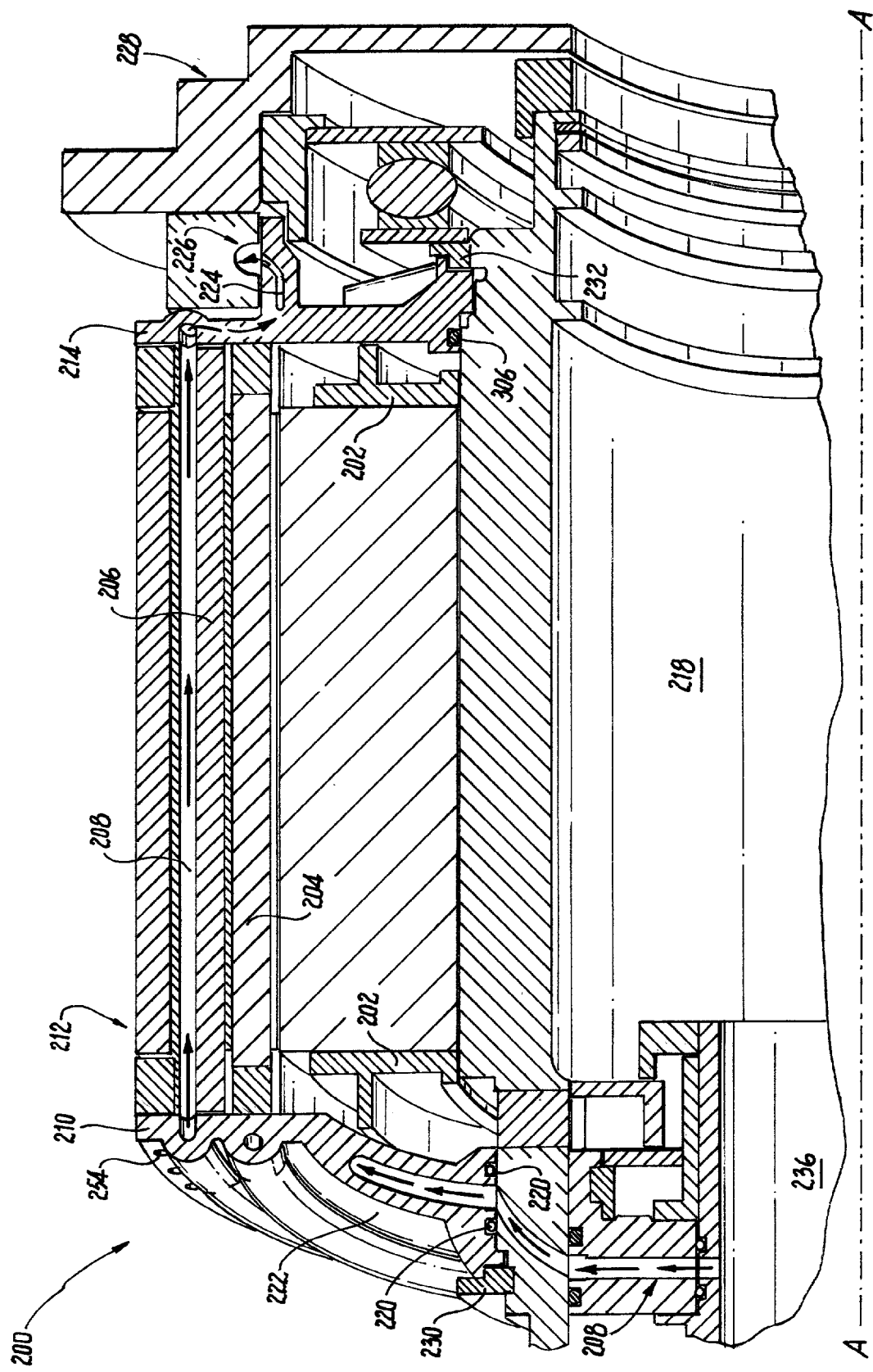
FIG. 8 is a schematic cross-sectional side elevation view of an embodiment of an electric machine rotor assembly constructed in accordance with the present disclosure, showing another supply end plate and return end plate.

With reference now to FIG. 8, an electric machine rotor assembly 200 includes a rotor core 202 defining a rotor axis A. Windings 204 are seated in the rotor core 202. A plurality of wedges 206, much as described above, but with only one flow passage 208 defined through each wedge 206, are circumferentially spaced apart around the rotor core 202 relative to the rotor axis A, much as described above with respect to assembly 100. Each wedge 206 extends axially and separates between two respective portions of the windings 204 (not shown in FIG. 8, but see FIGS. 1-7). A supply end plate 210 is mounted at a first axial end 212 of the rotor core 202 for supplying fluid to the rotor core 202. A return end plate 214 as described above is mounted at a second axial end 216 of the rotor core 202 opposite the first axial end 212. A flow path for coolant fluid extends through the supply end plate 210 into the wedges 206, through the wedges and into the return end plate 214, and through the return end plate 214 to a sump (not shown, but see FIGS. 1-7).

An inner rotor body 218 is mounted within the rotor core 202 for rotation in common with the rotor core 202. The flow path extends from within the inner rotor body 218, between an axially spaced pair of o-rings 220 sealing between the inner rotor body 218 and the rotor core 202, and into a set of end plate passages 222. The end plate passages 222 of the return end plate wind in an opposite clock-wise/counter-clockwise direction from end plate passages 222 of the supply end plate 210. The return end plate passages 224 feed into a volute 226 in a housing 228 that is stationary relative to the rotor core 202. As described above with reference to FIGS. 1-7, the volute 226 can lead to a sump away from rotational hardware of the assembly 200. The flow path 208 can pass lengthwise in proximity to the windings 204 and can completely bypass an air gap between the rotor core and a stator outward from the rotor core (not shown, but see above with respect to FIGS. 1-7). A first spanner nut 230 threaded to inner rotor body 218 secures the supply end plate 210 to the rotor core 202. A second spanner nut 232 is threaded to the inner rotor body 218 to secure the return end plate 214 to the rotor core 202.

Figure 9:
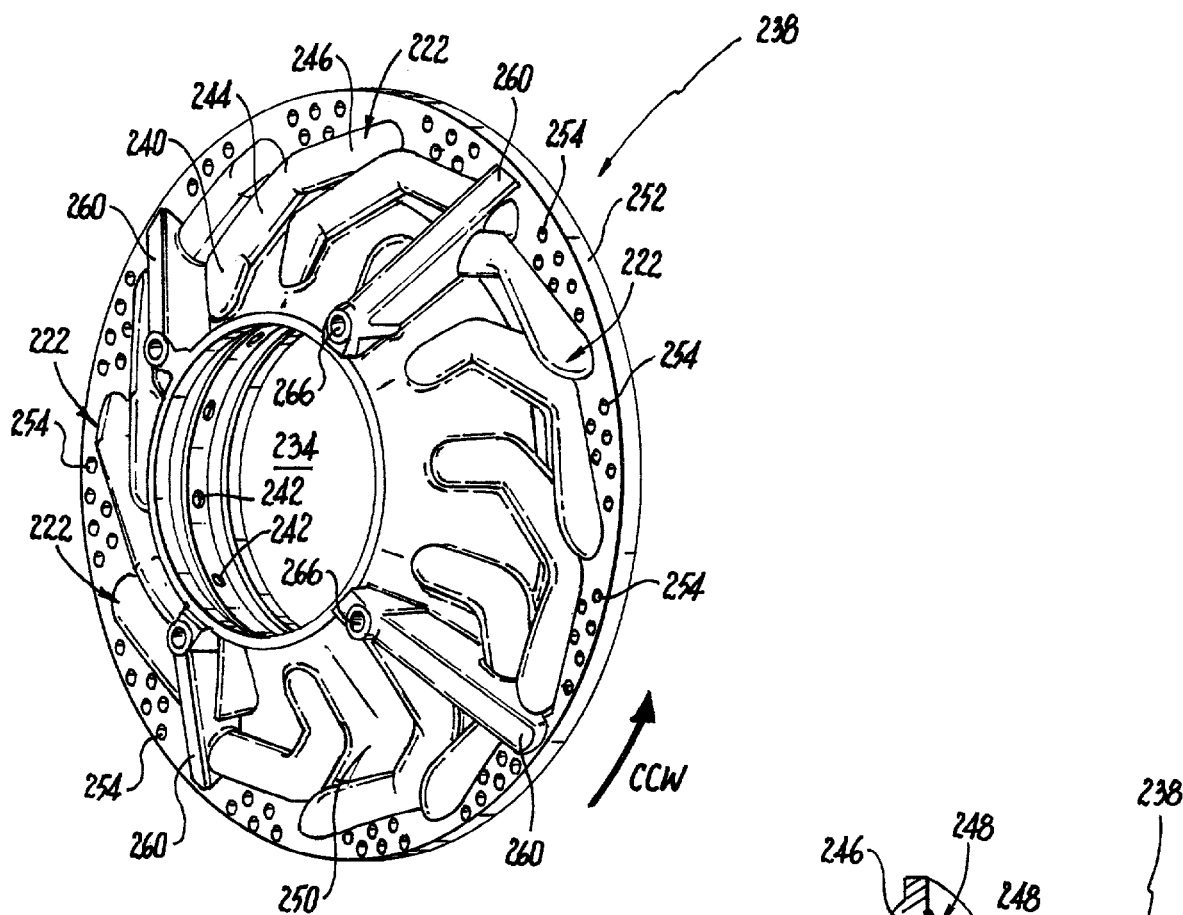
FIG. 9 is a perspective view of the supply end plate of FIG. 8, showing the structural ribs and end plate passages.

With reference now to FIG. 9, the supply end plate 210 has an aperture 234 therethrough configured to be mounted at the first axial end 212 of the inner rotor body 218 of the rotor core 202 for supplying fluid to the rotor core 202. The supply end plate 210 defines a plurality of end plate passages 222 therein (twelve are shown, but those skilled in the art will readily appreciate that any suitable number can be included without departing from the scope of this disclosure) extending radially outward from a radially inward portion 236 of the supply end plate 210 toward a radially outward portion 238 of the supply end plate. Each of the end plate passages 222 includes: a radial section 240 extending in a radial direction from an inlet 242 in the inward portion 236 of the supply end plate 210 toward the outward portion 238; a transition section 244 extending obliquely from the radial section 240; and a circumferential section 246 extending circumferentially from the transition section 244 to an outlet 248 (labeled in FIG. 10) of the supply end plate 210.

With continued reference to FIG. 9, the radial sections 240 and transition sections 244 of the plurality of end plate passages 222 conform to a frustoconical surface 250 of the supply end plate 210. The circumferential sections 246 conform to a radial flange 252 of the supply end plate 210. The radial flange 252 includes a plurality of balancing holes 254 defined axially therethrough. Each radial section 240, transition section 244, and circumferential section 246 is straight, but those skilled in the art will readily appreciate that curves can be used to enhance fluid flow or ease of manufacture without departing from the scope of this disclosure.

Figure 10:
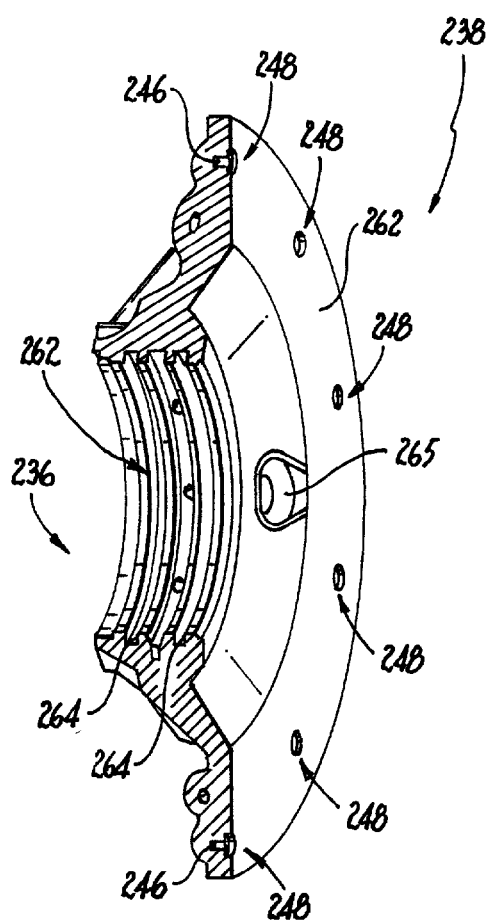
FIG. 10 is a cross-sectional perspective view of the supply end plate of FIG. 8, viewed from the opposite side of that shown in FIG. 9.
Figure 13:
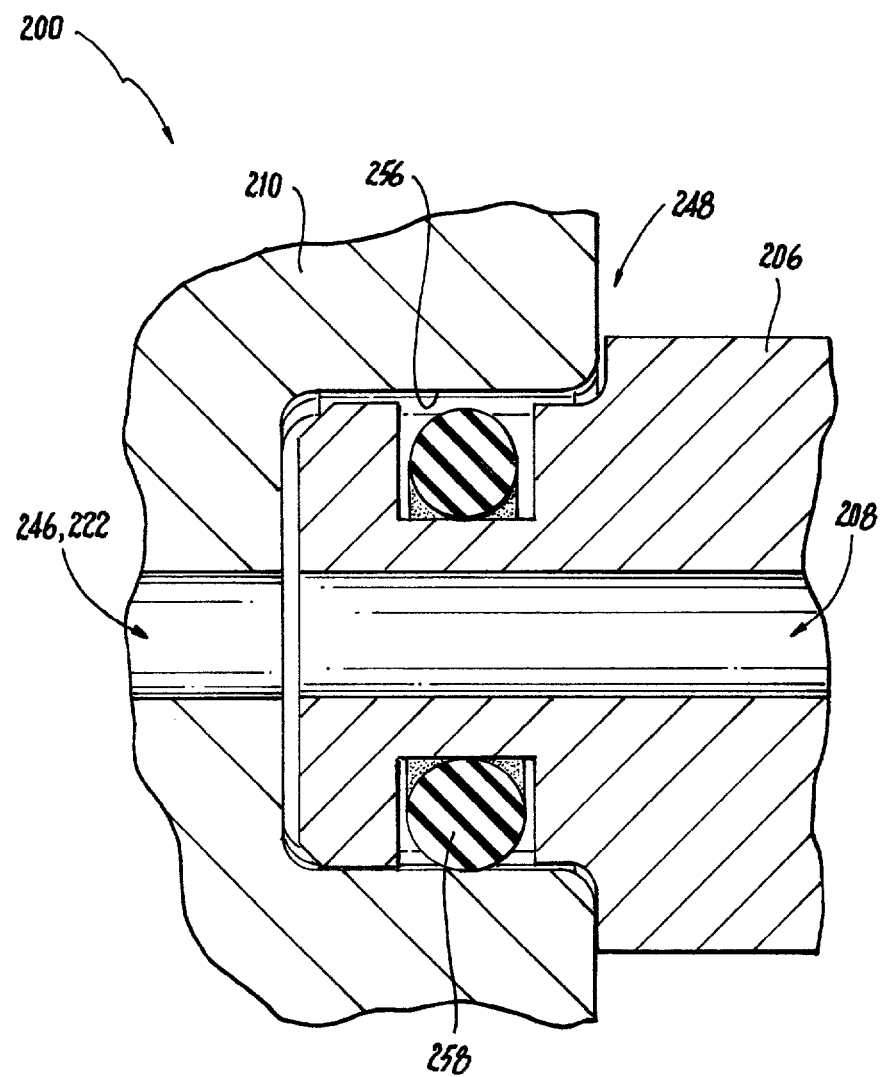
FIG. 13 is a cross-sectional perspective view of a portion of the assembly of FIG. 8, showing the engagement of the supply end plate with one of the wedges.

With reference to FIG. 10, each of the circumferential sections 246 terminates at a respective outlet 248. As shown in FIG. 13 each outlet 248 includes countersunk axial connection bore 256 (not shown in FIG. 10, but see FIG. 13) configured to seal to a wedge 206 with an o-ring 258 (shown in FIG. 13) assembled thereon for delivering fluid from the circumferential section 246 of the end plate passage 222 of the supply end plate 210 into the portion of the flow path 208 in the wedge 206 through a sealed connection. A plurality of structural ribs 260 extend from the inward portion 236 to the outward portion 238 for rigidity of the supply end plate 210, wherein the structural ribs 260 extend conically along the conical surface 250 of the supply end plate 210. Four ribs 260 are shown, however those skilled in the art will readily appreciate that any suitable number of ribs can be included, including a single frustoconical rib that subtends the entire 360° extent of the supply end plate 210, without departing from the scope of this disclosure.

With reference to FIG. 10, most of the structure of the supply end plate 210 can be made by casting or additive manufacturing, and the machined portions 262 can be machined in a subtractive process for precision. The two grooves 264 on the inward portion 236 provide seats for the o-rings 220 shown in FIG. 8. The pocket 265 can be provided to give clearance for other hardware internal to the rotor core 202 of FIG. 8. As shown in FIG. 9, optionally, helicoils 266 in screw bosses can be used as a means to prevent rotation of the spanner nut 230, the spanner nut being used to retain the supply end plate on the end of the rotor core 202.

Figure 11:
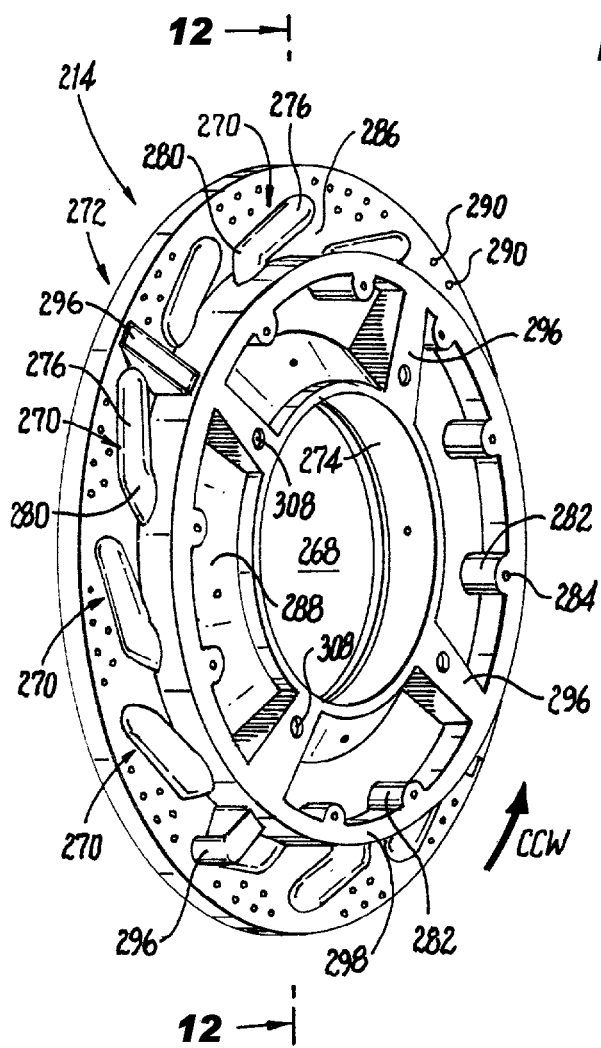
FIG. 11 is a cross-sectional perspective view of the return end plate of FIG. 8, showing the structural ribs and end plate passages.

With reference now to FIG. 11, the return end plate 214 has an aperture 268 therethrough configured to be mounted at a second axial end 216 of the rotor core 202 opposite the first axial end to receive fluid flowing from the first end 212 of the rotor core 202 to the second end 216 of the rotor core 202 as shown in FIG. 8. The return end plate 214 defines a plurality of end plate passages 270 therein extending inward from an outward portion 272 of the return end plate 214 toward an inward portion 274 of the return end plate 214. Each of the end plate passages 270 includes: a first tangential section 276 extending from an inlet 278 (labeled in FIG. 12) in the outward portion 272 of the return end plate 214 toward the inward portion 274 in a circumferential and radial tangential direction. A second tangential section 280 of the end plate passage 270 extends from the first tangential section 276 in a direction more radial than that of the first tangential section 276 toward the inward portion 274. An axial section 282 of the end plate passage 270 extends in an axial direction from the second tangential section 280 to an outlet 284 of the return end plate 214.

Figure 14:
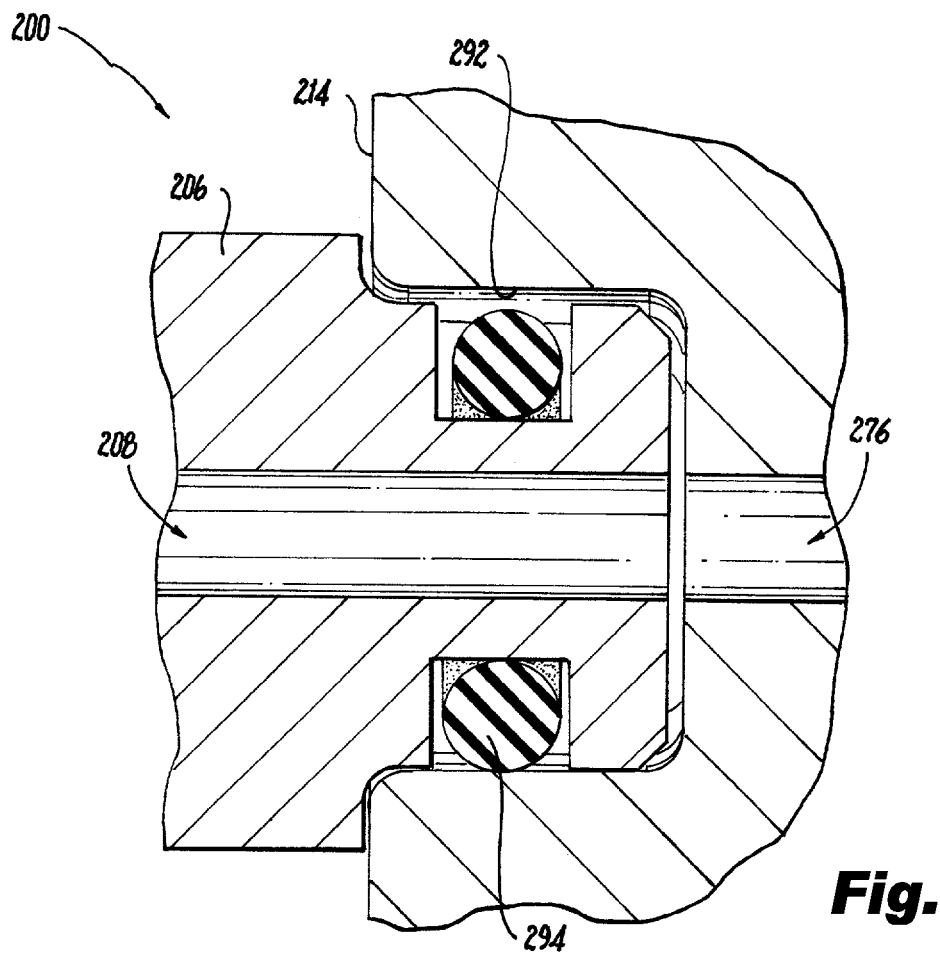
FIG. 14 is a cross-sectional perspective view of a portion of the assembly of FIG. 8, showing the engagement of the supply end plate with one of the wedges.
Figure 15:
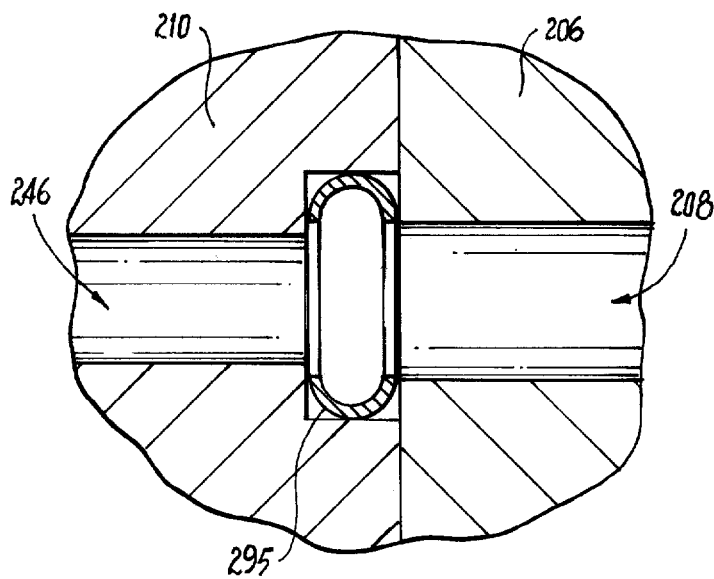
FIG. 15 shows another sealing arrangement that can be used in lieu of that shown in FIGS. 13 and/or 14.

The first and second tangential sections 276, 280 of the end plate passages 270 conform to a radial flange 286 of the return end plate 214 outward from a frustoconical section 288. The radial flange 286 includes a plurality of balancing holes 290 defined axially therethrough. Each axial section 282, first tangential section 276, and second tangential section 280 are straight, but those skilled in the art will readily appreciate that curves can be used to enhance fluid flow or ease of manufacture without departing from the scope of this disclosure. Each of the first tangential portions 276 originates at a respective inlet 278. As shown in FIG. 14, each inlet 278 includes a countersunk axial connection bore 292 configured to seal to a wedge 206 with an o-ring 294 assembled thereon for delivering fluid the wedge 206 through a sealed connection into the return end plate 214. FIG. 15 shows another sealing arrangement that can be used with a c-ring 295 in lieu of the o-ring 292/258 of FIGS. 13-14.

With reference again to FIG. 11, a plurality of radiating structural ribs 296 can extend from the inward portion 274 to the outward portion 272 for rigidity of the return end plate 214, wherein the structural ribs 296 extend conically. An annular structural rib 298 can intersect each of the radiating structural ribs 296. The outlets 300 (labeled in FIG. 12) of the return end plate 214 face radially outward from the annular structural rib 298 to feed into the volute 226 shown in FIG. 8. Four ribs 296 are shown, however those skilled in the art will readily appreciate that any suitable number of ribs can be included, including a single frustoconical rib that subtends the entire 360° extent of the return end plate 214, without departing from the scope of this disclosure.

Figure 12:
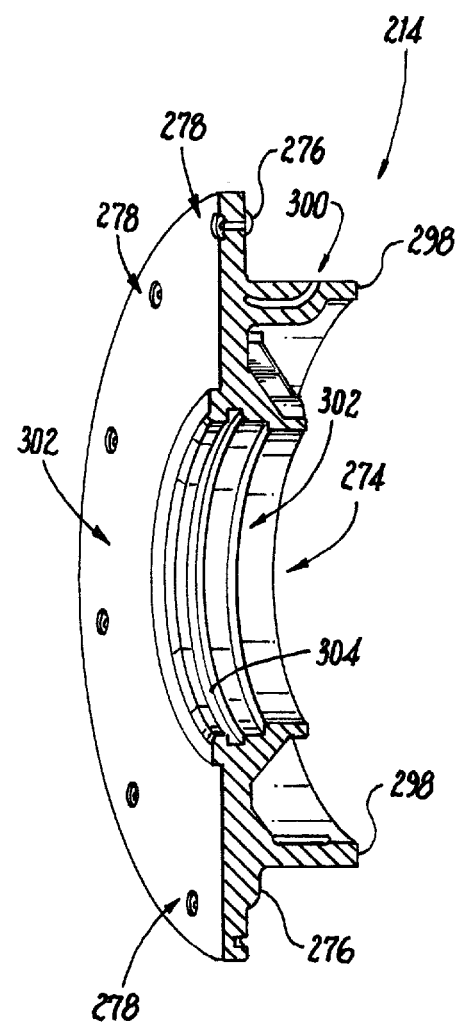
FIG. 12 is a cross-sectional perspective view of the return end plate of FIG. 8, viewed from the opposite side of that shown in FIG. 11.

With reference to FIG. 12, most of the structure of the return end plate 214 can be made by casting or additive manufacturing, and the machined portions 302 can be machined in a subtractive process for precision. A groove 304 on the inward portion 274 (see FIG. 11) provide seats for the o-ring 306 shown in FIG. 8. As shown in FIG. 11, optionally, helicoils 308 in screw bosses can be used as a means to prevent rotation of the spanner nut 230, the spanner nut 230 being used to retain the supply end plate on the end of the rotor core 202.

The methods and systems of the present disclosure, as described above and shown in the drawings, provide for rotor cooling with superior properties including close proximity of cooling flow to windings with little or no coolant flow into the rotor/stator air gap. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An apparatus comprising:
a supply end plate with an aperture therethrough configured to be mounted at a first axial end of a rotor core for porting fluid to the rotor core, wherein the supply end plate defines a plurality of end plate passages extending radially outward from a radially inward portion of the supply end plate toward a radially outward portion of the supply end plate, wherein each of the plurality of end plate passages includes:
a radial section extending in a radial direction from an inlet in the radially inward portion of the supply end plate toward the radially outward portion;
a transition section extending obliquely from the radial section; and
a circumferential section extending circumferentially from the transition section to an outlet of the supply end plate, wherein the radial section and transition section of the plurality of end plate passages conform to a frustoconical surface of the supply end plate, and wherein the circumferential section conform to a radial flange of the supply end plate.

2. The apparatus as recited in claim 1, wherein the radial flange includes a plurality of balancing holes defined axially therethrough.

3. The apparatus as recited in claim 1, wherein each radial section, transition section, and circumferential section is straight.

4. An apparatus comprising:
a supply end plate with an aperture therethrough configured to be mounted at a first axial end of a rotor core for porting fluid to the rotor core, wherein the supply end plate defines a plurality of end plate passages extending radially outward from a radially inward portion of the supply end plate toward a radially outward portion of the supply end plate, wherein each of the plurality of end plate passages includes:
a radial section extending in a radial direction from an inlet in the radially inward portion of the supply end plate toward the radially outward portion;
a transition section extending obliquely from the radial section; and
a circumferential section extending circumferentially from the transition section to an outlet of the supply end plate, wherein each radial section, transition section, and circumferential section is straight, wherein the circumferential section terminates at a countersunk axial connection bore configured to seal to a wedge with a c-ring assembled thereon for delivering fluid from the supply end plate into the wedge through a sealed connection.

5. An apparatus comprising:
a supply end plate with an aperture therethrough configured to be mounted at a first axial end of a rotor core for porting fluid to the rotor core, wherein the supply end plate defines a plurality of end plate passages extending radially outward from a radially inward portion of the supply end plate toward a radially outward portion of the supply end plate, wherein each of the plurality of end plate passages includes:
a radial section extending in a radial direction from an inlet in the radially inward portion of the supply end plate toward the radially outward portion;

a transition section extending obliquely from the radial section; and a circumferential section extending circumferentially from the transition section to an outlet of the supply end plate, further comprising a plurality of structural ribs extending from the inward portion to the outward portion for rigidity of the supply end plate, wherein the structural ribs extend conically along a conical surface of the supply end plate.

6. A return end plate apparatus comprising:
  a return end plate with an aperture therethrough configured to be mounted at a second axial end of a rotor core opposite a first axial end to receive fluid flowing from the first axial end of the rotor core to the second axial end of the rotor core, wherein the return end plate defines a plurality of end plate passages therein extending inward from an outward portion of the return end plate toward an inward portion of the return end plate, wherein each of the plurality of end plate passages includes:
    a first tangential section extending from an inlet in the outward portion of the return end plate toward the inward portion in a circumferential and radial tangential direction;
    a second tangential section extending from the first tangential section in a direction more radial than that of the first tangential section toward the inward portion; and
    an axial section extending in an axial direction from the second tangential section to an outlet of the return end plate, wherein the first section and the second tangential section of the plurality of end plate passages conform to a radial flange of the return end plate outward from a frustoconical section.

7. The apparatus as recited in claim 6, wherein the radial flange includes a plurality of balancing holes defined axially therethrough.

8. The apparatus as recited in claim 6, wherein each axial section, first tangential section, and second tangential section is straight.

9. A return end plate apparatus comprising:
  a return end plate with an aperture therethrough configured to be mounted at a second axial end of a rotor core opposite a first axial end to receive fluid flowing from the first axial end of the rotor core to the second axial end of the rotor core, wherein the return end plate defines a plurality of end plate passages therein extending inward from an outward portion of the return end plate toward an inward portion of the return end plate, wherein each of the plurality of end plate passages includes:
    a first tangential section extending from an inlet in the outward portion of the return end plate toward the inward portion in a circumferential and radial tangential direction;
    a second tangential section extending from the first tangential section in a direction more radial than that of the first tangential section toward the inward portion; and
    an axial section extending in an axial direction from the second tangential section to an outlet of a supply end plate, wherein the first tangential section originates at a countersunk axial connection bore configured to seal to a wedge with a c-ring assembled thereon for delivering fluid the wedge through a sealed connection into the return end plate.

10. A return end plate apparatus comprising:
  a return end plate with an aperture therethrough configured to be mounted at a second axial end of a rotor core opposite a first axial end to receive fluid flowing from the first axial end of the rotor core to the second axial end of the rotor core, wherein the return end plate defines a plurality of end plate passages therein extending inward from an outward portion of the return end plate toward an inward portion of the return end plate, wherein each of the plurality of end plate passages includes:
    a first tangential section extending from an inlet in the outward portion of the return end plate toward the inward portion in a circumferential and radial tangential direction;
    a second tangential section extending from the first tangential section in a direction more radial than that of the first tangential section toward the inward portion; and
    an axial section extending in an axial direction from the second tangential section to an outlet of a supply end plate, further comprising a plurality of radiating structural ribs extending from the inward portion to the outward portion for rigidity of the return end plate, wherein the structural ribs extend conically.

11. The apparatus as recited in claim 10, further comprising an annular structural rib intersecting each of the radiating structural ribs, wherein the outlets of the supply end plate face radially outward from the annular structural rib.

12. An electric machine rotor assembly comprising:
  a rotor core defining a rotor axis;
  windings seated in the rotor core;
  a plurality of wedges circumferentially spaced apart around the rotor core relative to the rotor axis, each wedge extending axially and separating between two respective portions of the windings;
  a supply end plate with an aperture therethrough mounted at a first axial end of the rotor core for supplying fluid to the rotor core, wherein the supply end plate defines a plurality of end plate passages therein extending outward from an inward portion of the supply end plate toward an outward portion of the supply end plate, wherein each of the plurality of end plate passages includes:
    a radial section extending in a radial direction from an inlet in the inward portion of the supply end plate toward the outward portion;
    a transition section extending obliquely from the radial section; and
    a circumferential section extending circumferentially from the transition section to an outlet of the supply end plate; and
  a return end plate mounted at a second axial end of the rotor core opposite the first axial end, wherein a flow path for coolant fluid extends through the supply end plate into the wedges, through the wedges and into the return end plate, and through the return end plate, wherein the radial section and transition section of the plurality of end plate passages conform to a frustoconical surface of the supply end plate, and wherein the circumferential section conforms to a radial flange of the supply end plate, wherein a first tangential section and a second tangential section of the plurality of end plate passages conform to a radial flange of the return end plate outward from a frustoconical section.

13. The assembly as recited in claim 12, further comprising an inner rotor body mounted within the rotor core for rotation in common with the rotor core, wherein the flow path extends from within the inner rotor body, between an axially spaced pair of o-rings sealing between the inner rotor body and the rotor core, and into a set of end plate passages.

14. The assembly as recited in claim 12, wherein the flow path passes lengthwise in proximity to the windings and completely bypasses an air gap between the rotor core and a stator outward from the rotor core.

15. The assembly as recited in claim 12, wherein a first spanner nut secures the supply end plate to the rotor core and a second spanner nut secures the return end plate to the rotor core.

16. An electric machine rotor assembly comprising:
a rotor core defining a rotor axis;
windings seated in the rotor core;
a plurality of wedges circumferentially spaced apart around the rotor core relative to the rotor axis, each wedge extending axially and separating between two respective portions of the windings;
a supply end plate with an aperture therethrough mounted at a first axial end of the rotor core for supplying fluid to the rotor core, wherein the supply end plate defines a plurality of end plate passages therein extending outward from an inward portion of the supply end plate toward an outward portion of the supply end plate, wherein each of the plurality of end plate passages includes:
a radial section extending in a radial direction from an inlet in the inward portion of the supply end plate toward the outward portion;
a transition section extending obliquely from the radial section; and
a circumferential section extending circumferentially from the transition section to an outlet of the supply end plate; and
a return end plate mounted at a second axial end of the rotor core opposite the first axial end, wherein a flow path for coolant fluid extends through the supply end plate into the wedges, through the wedges and into the return end plate, and through the return end plate, wherein the radial section and transition section of the plurality of end plate passages conform to a frustoconical surface of the supply end plate, and wherein the circumferential section conforms to a radial flange of the supply end plate, wherein a first tangential section and a second tangential section of the plurality of end plate passages conform to a radial flange of the return end plate outward from a frustoconical section, further comprising an inner rotor body mounted within the rotor core for rotation in common with the rotor core, wherein the flow path extends from within the inner rotor body, between an axially spaced pair of o-rings sealing between the inner rotor body and the rotor core, and into a set of end plate passages, wherein the end plate passages of the return end plate wind in an opposite clock-wise/counter-clockwise direction from end plate passages of the supply end plate.

17. The assembly as recited in claim 16, wherein the return end plate passages feed into a volute in a housing that is stationary relative to the rotor core.

18. The assembly as recited in claim 17, wherein the volute leads to a sump away from rotational hardware of the assembly.

* * * * *